July 11, 1967 F. PLASSER ET AL 3,330,219
METHOD AND APPARATUS FOR REPLACING AN OLD TRACK BY A NEW TRACK
Filed Sept. 21, 1964 11 Sheets-Sheet 3
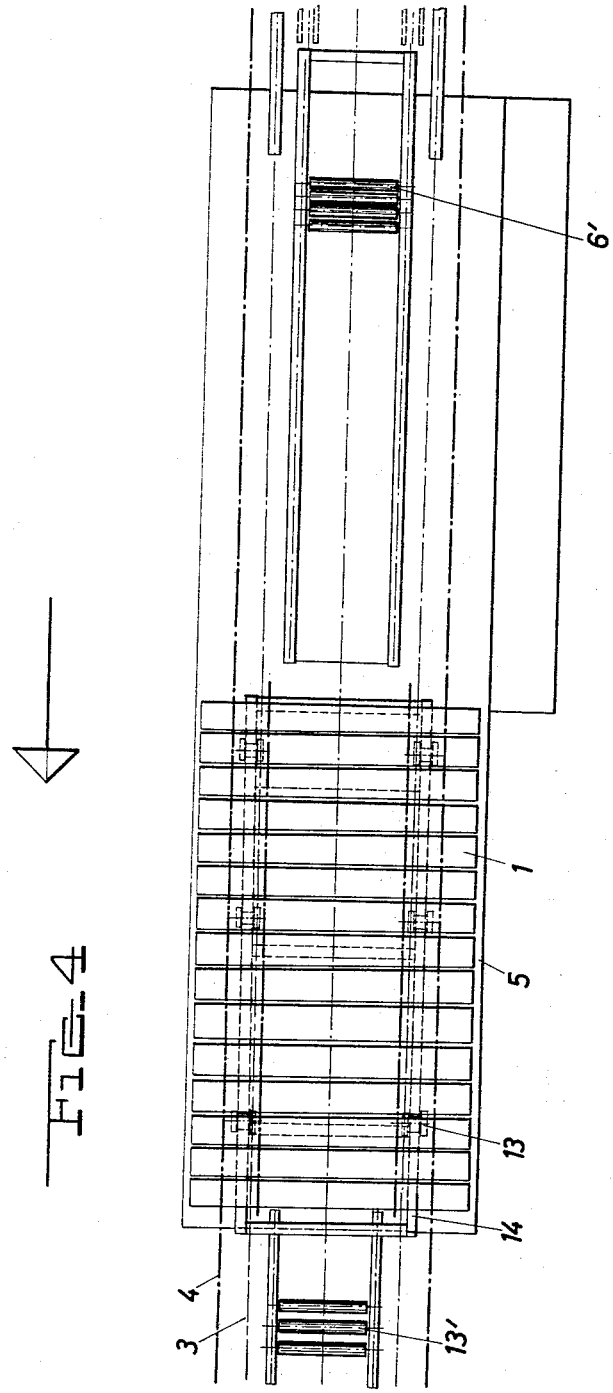
INVENTORS.
FRANZ PLASSER
JOSEF THEURER
BY EGON SCHUBERT
Kurt Kelman
agent

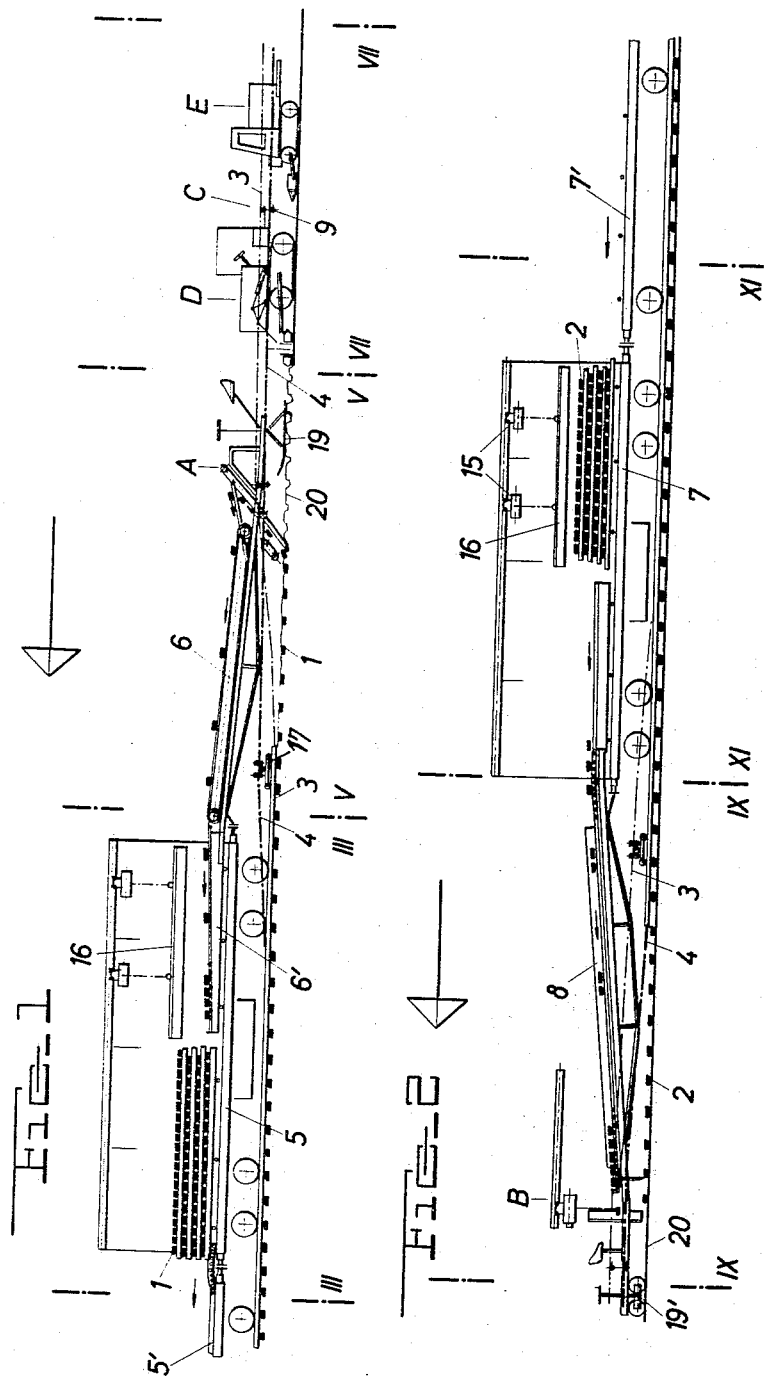

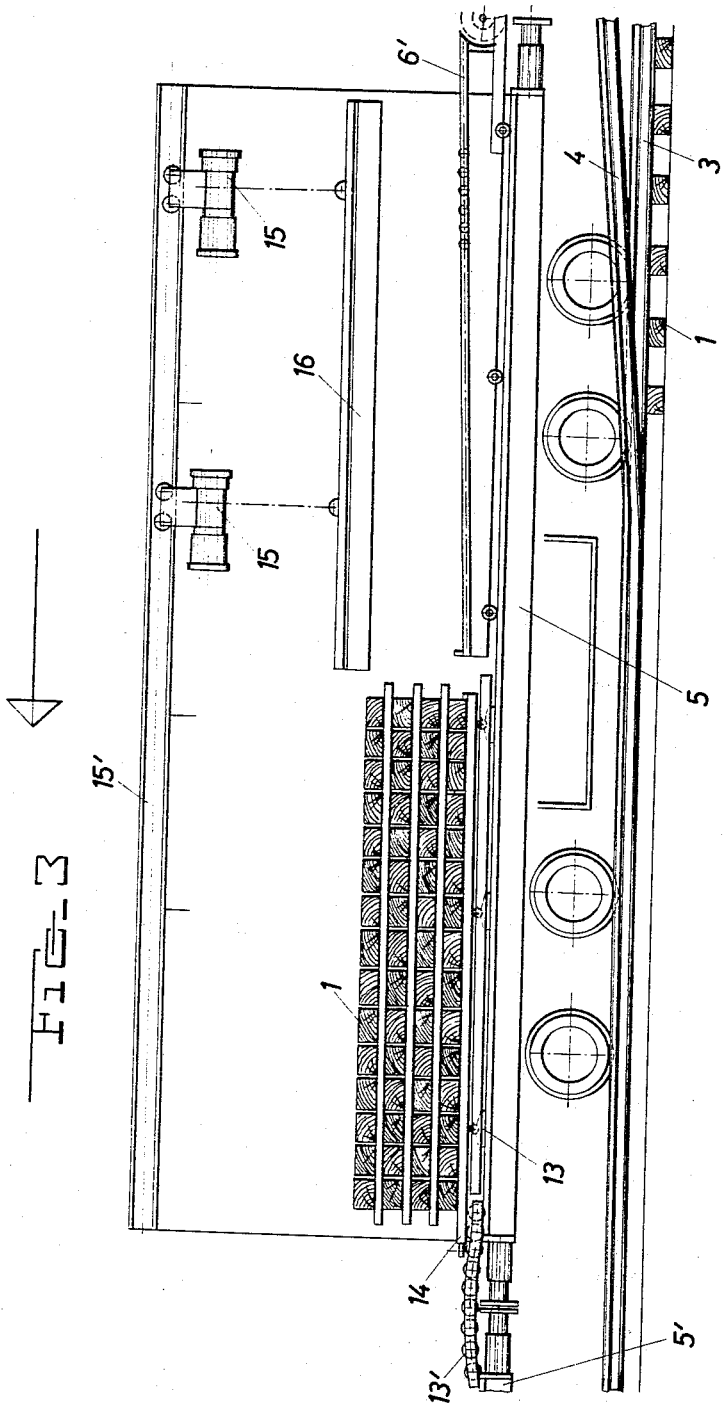

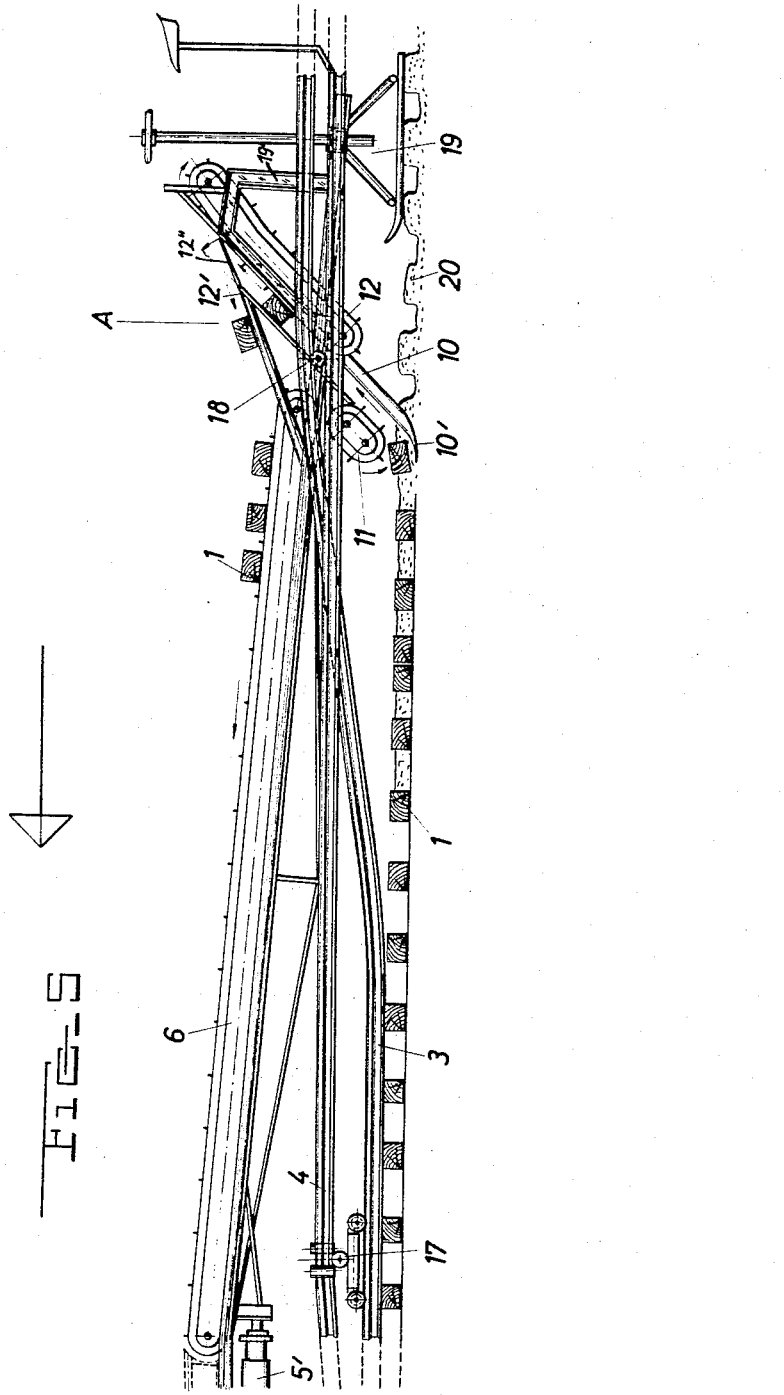

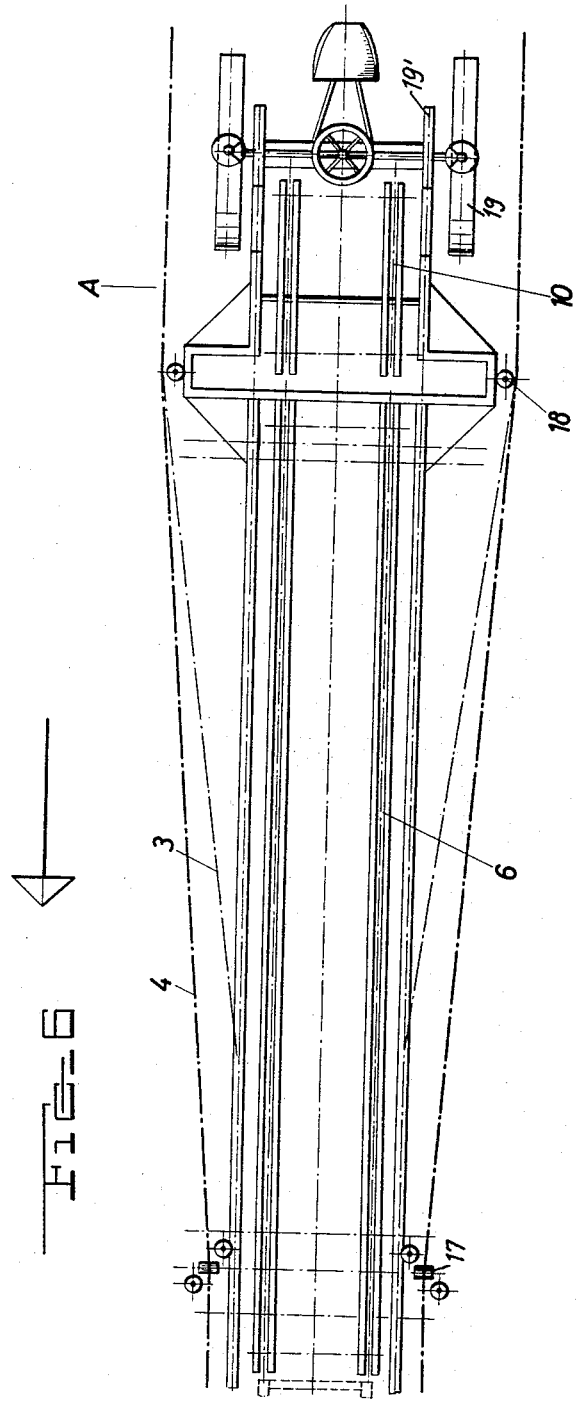

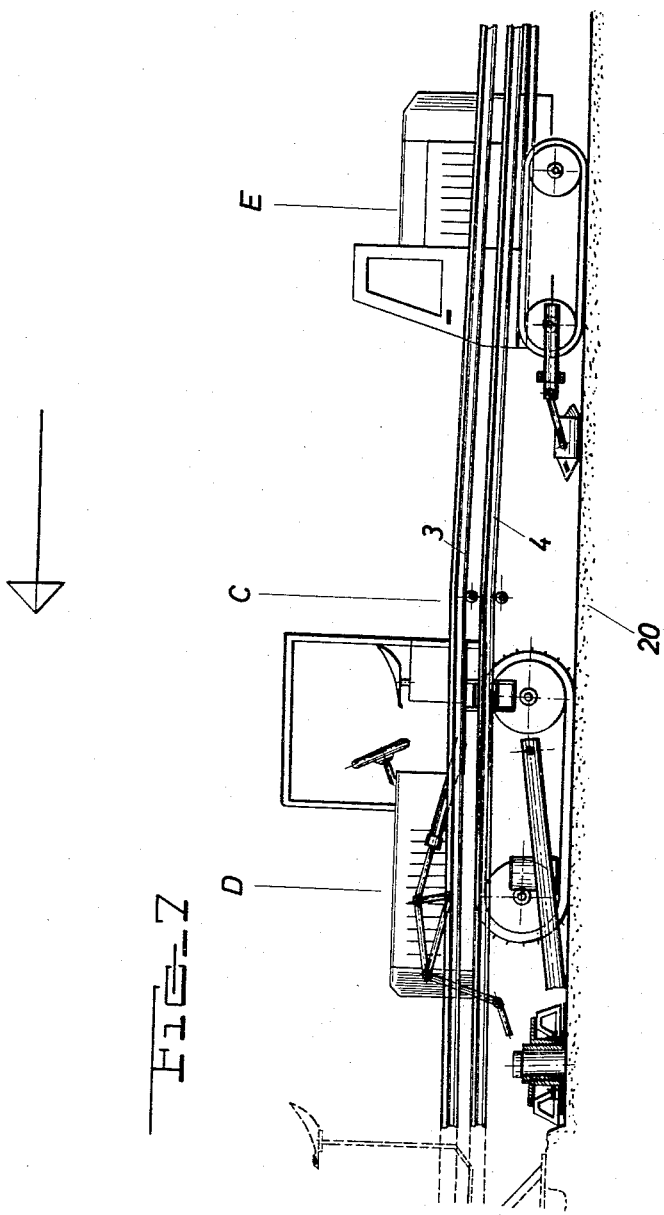

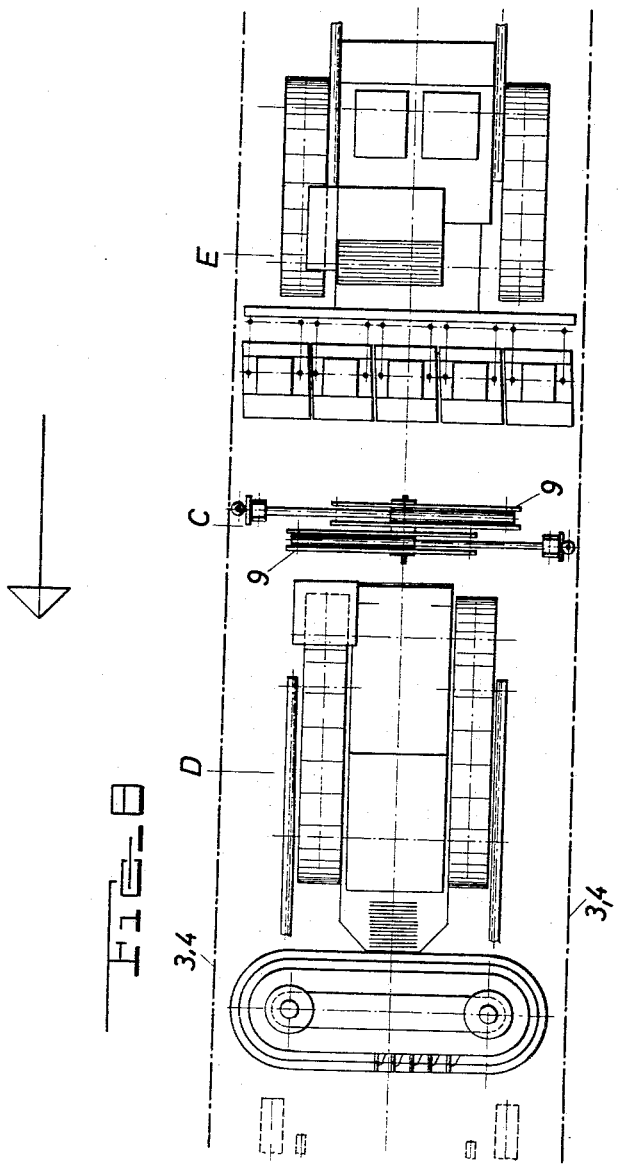

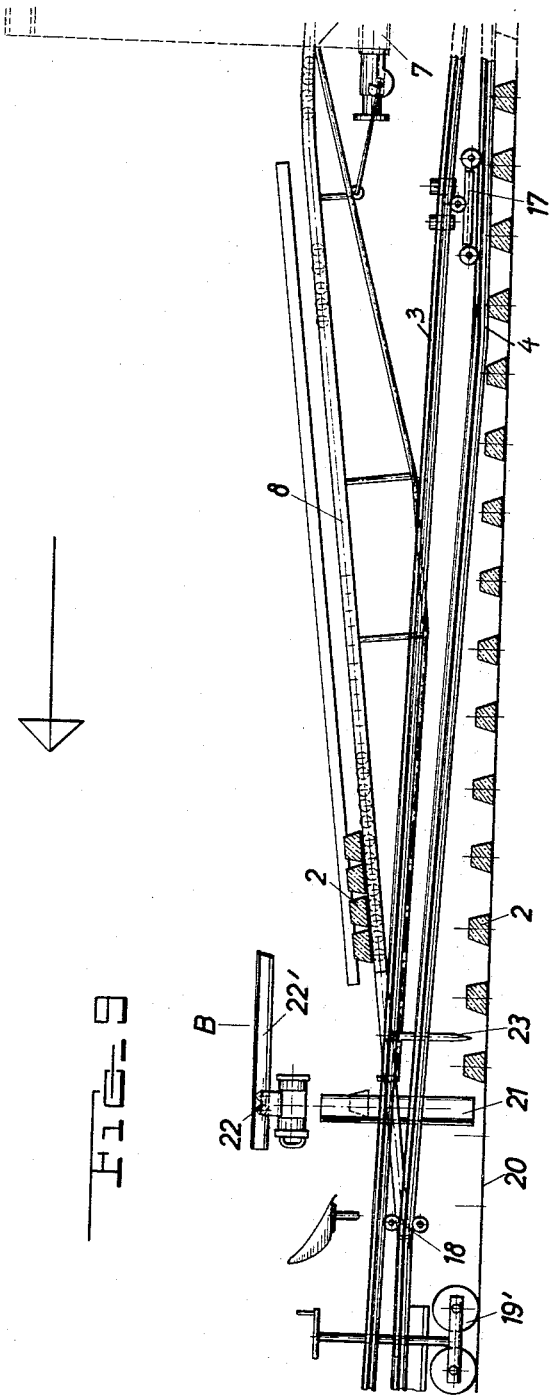

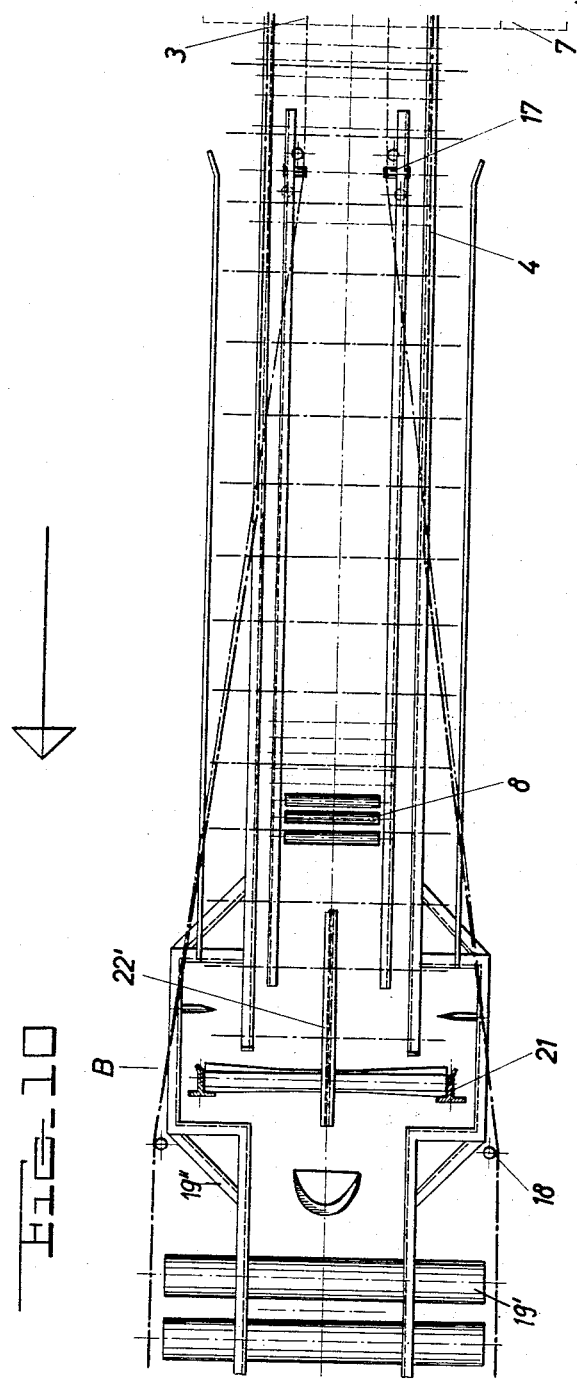

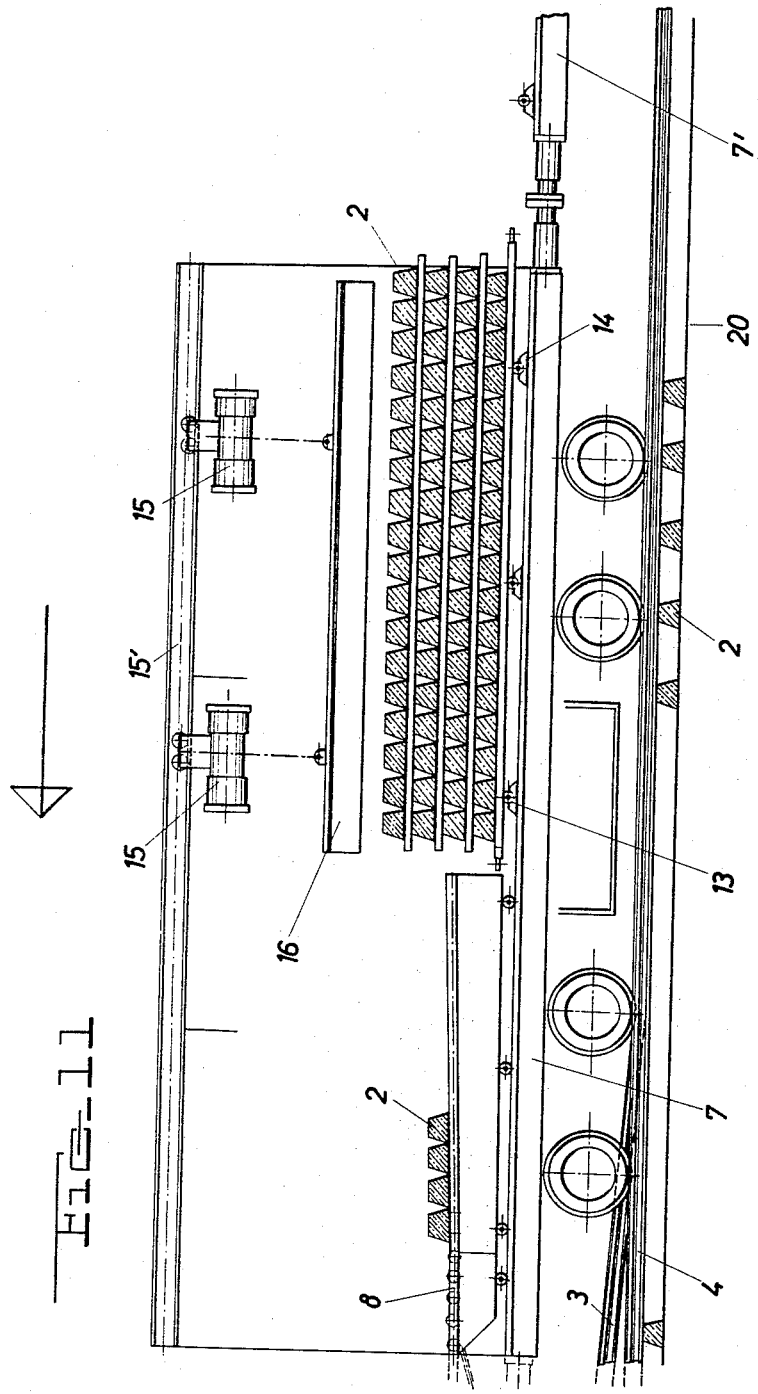

July 11, 1967   F. PLASSER ET AL   3,330,219
METHOD AND APPARATUS FOR REPLACING AN OLD TRACK BY A NEW TRACK
Filed Sept. 21, 1964                                11 Sheets-Sheet 11
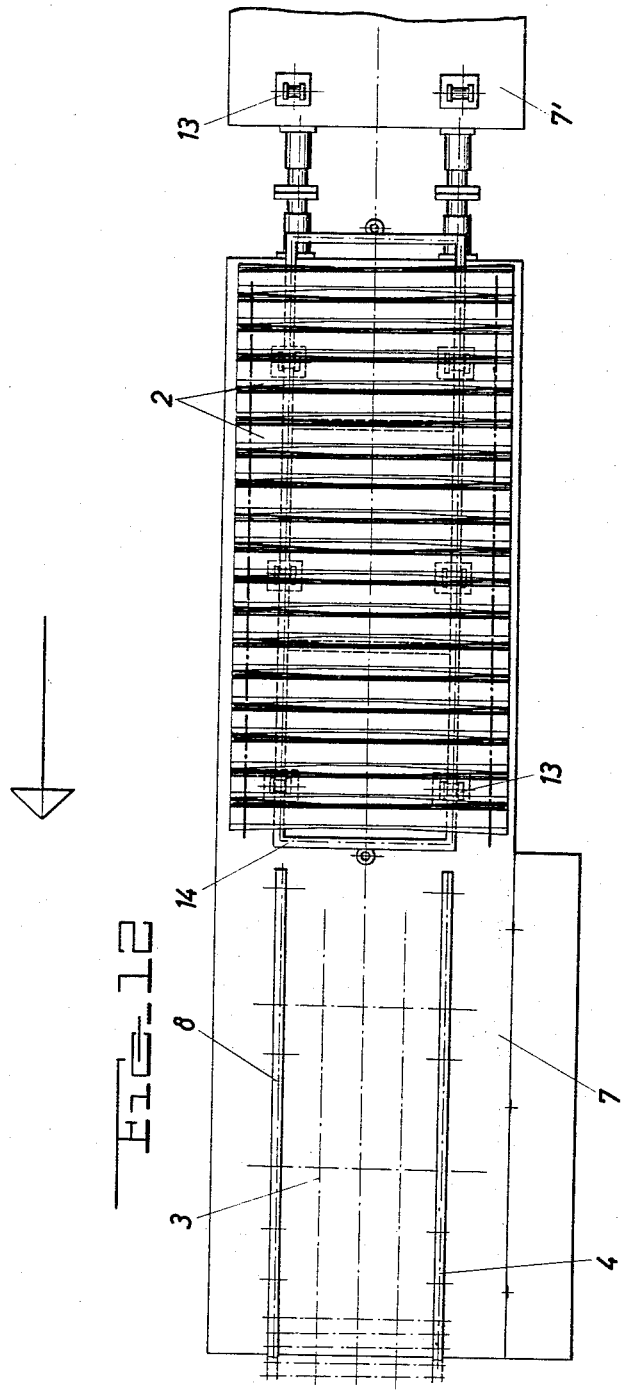
INVENTORS.
FRANZ PLASSER
JOSEF THEURER
BY  EGIN SCHUBERT United States Patent Office 3,330,219
Patented July 11, 1967

3,330,219
METHOD AND APPARATUS FOR REPLACING AN OLD TRACK BY A NEW TRACK
Franz Plasser and Josef Theurer, both of Johannesgasse 3, Vienna I, Austria, and Egon Schubert, Sturzgasse 17, Vienna, Austria
Filed Sept. 21, 1964, Ser. No. 397,764
Claims priority, application Austria, Sept. 23, 1963, 7,645/63
8 Claims. (Cl. 104—2)

The present invention relates to improvements in track renewal operations.

It is the primary object of this invention to provide an efficient system for replacing old by new tracks in a continuous operation using largely conventional, relatively light and economical equipment.

This and other objects and advantages in track renewal are accomplished according to the invention by loosening the rails from the ties, spreading the rails in a horizontal plane to a lateral spacing at least equal to the lengths of the ties, removing the old ties and laying the new ties between the spread rails, the old ties being removed and the new ties being laid perpendicularly to the elongation of the track. Preferably, the loosened rails are lifted before they are spread and are maintained lifted and spread while the old ties are removed and the new ties are laid.

In the improved track renewal system of the present invention, it is possible either to replace only the ties or to renew the track completely by also replacing the old rails by new rails. If this is desired, new rails are placed on the old ties adjacent the old rails, preferably laterally outside the old track rails, the new rails are spread in the same manner as the old rails while the old ties are removed and the new ties are laid, and the new rails are then laid on the newly laid new ties while the old rails are placed thereon adjacent the newly laid new rails for subsequent removal.

The apparatus for carrying out the track renewal according to the invention comprises a forward transport car for old ties and a rear transport car for new ties. A means for spreading the track rails, a means for removing the old ties and a means for laying the new ties are arranged between the forward and rear transport cars. Respective conveyor means convey the old ties from the tie removing means to the forward transport car and from the rear transport car to the tie laying means. Preferably, the rail spreading means comprises horizontally extending hydraulic jack means for gripping and spreading the rails. The jack means are arranged between the means for removing the old ties and for laying the new ties.

The above and other objects and advantages of the present invention will become more apparent from the following detailed description of a preferred embodiment of an apparatus designed to move along a right of way to replace the ties and rails with a new track according to this invention, as illustrated in the accompanying drawing wherein FIGS. 1 and 2 are schematic side views of the entire arrangement, the views being separated into two figures merely for the sake of convenience to avoid showing the various parts of the rather long arrangement on too small a scale and FIG. 1 showing the forward portion while FIG. 2 illustrates the rear portion of the apparatus;

FIG. 3 is an enlarged side view and FIG. 4 is a corresponding top view of the section V—V of the apparatus, indicated in FIG. 1;

FIG. 5 is an enlarged side view and FIG. 6 is a corresponding top view of the section V—V of the apparatus, indicated in FIG. 1;

FIG. 7 is an enlarged side view and FIG. 8 is a corresponding top view of the section VII—VII of the apparatus, indicated in FIG. 1;

FIG. 9 is an enlarged side view and FIG. 10 is a corresponding top view of the section IX—IX of the apparatus, indicated in FIG. 2; and FIG. 11 is an enlarged side view and FIG. 12 is a corresponding top view of the section XI—XI of the apparatus, indicated in FIG. 2.

Referring now to the drawing and first to the overall arrangement shown in FIGS. 1 and 2, it will be noted that large arrows in all figures indicate the direction of movement of the apparatus along the right of way during the track laying operation. In this operation, the old ties 1, which are to be replaced, are seen in FIG. 1, i.e. in the forward portion of the apparatus, as determined by the direction of the movement of the apparatus, while the new ties 2, which replace ties 1, are located in FIG. 2, i.e. the rear portion of the apparatus. The old rails 3 on the old ties 1 serve as track for the forward cars 5, 5' of the apparatus, which have wheels for mobility on the track, while the rear cars 7, 7', also provided with wheels for mobility on a track, move on the new track consisting of new ties 2 and new rails 4. Arranged between the tie and rail transport cars 5 and 7 are the means essential for removing the old track and laying the new one, i.e. a means A for removing the old ties 2, a means D for leveling the ballast, a means C for spreading apart rails 3 and 4 in a horizontal plane, a ballast tamper E and a means B for laying the new ties 2. Respective conveyor means 6 and 8 are arranged between the tie removing means A and the forward transport car 5, and the tie laying means B and the rear transport car 7.

The various portions of the apparatus, as more clearly shown in the enlarged views of FIGS. 3–11, will now be separately described in connection with these figures.

Front and rear tie transport cars 5 and 7 being substantially alike, they will be described together with reference to FIGS. 3, 4, 11 and 12, like reference numerals referring to like parts. Flat cars 5' and 7' are coupled to transport cars 5 and 7, respectively, to store the old ties 1 coming off car 5 and to maintain a supply of new ties 2 for car 7. The ties are stacked on frames 14 which are movable on rollers 13 so that the ties may be moved in the direction of the right of way from one car to the next for storage, the spaces between the cars being bridged by roller conveyors 13'.

Overhead conveyors or crabs are mounted on transport cars 5 and 7, each consisting of pairs of trolleys 15, 15 moving on trolley tracks 15' extending in the direction of the right of way and two parallel gripping rails 16, 16 suspended from the trolleys. The gripping rails have longitudinally extending rims designed to engage the ends of the ties and thus to carry them, respectively, from the conveyor 6' forwardly onto frames 14 or from the frames 14 to the conveyor 8.

The apparatus A for removing the old ties 1 will now be described in connection with FIGS. 5 and 6.

As previously explained, the forward cars 5, 5' move on the old rails and before the old track is removed, after the forward end of the apparatus has rolled thereover, old rails 3 are loosened from old ties 1 to make it possible for the rails to be spread and taken up, and for the ties to be removed from the ballast bed 20. The tie removing apparatus is mounted on a sliding carriage 19 which is adapted to move on the ballast bed, from which the track has been removed, as best seen in FIG. 5. The sliding carriage carries a support frame 19' for means arranged to pick up and to remove ties 1 from ballast bed 20 in a continuous manner, as the carriage 19 slides forwardly along the right of way. For this purpose, there is provided an upwardly inclined tie guiding and supporting plane 10 constituted by a pair of rails having upwardly bent ends 10' designed to dig into the ballast bed and under each tie, as seen in FIG. 5, to force the tie onto the upwardly inclined plane 10 during the forward movement of sliding carriage 19. As the tie is forced onto plane 10, it is gripped by endless conveyor belts 11 to move it upwardly onto endless conveyor 12. The upper run of conveyor 12 lies in plane 10 and moves the tie to a pivotal extension 12" of the downwardly inclined gliding support 12' so that the tie will glide onto endless conveyor 6 leading to transport car 5.

In this manner, the old ties are continuously removed from the bed and loaded onto the conveyor 6' on transport car 5, which receives the ties from conveyor 6. From conveyor 6', rows of rails are placed by gripping rails 16, 16 onto frames 14 and stacked, as described hereinabove.

Of course, before the old ties can be picked up at 10', the old rails 3 must be picked up and spread laterally sufficiently to permit the ties to pass between the rails without being turned out of their position perpendicular to the right of way. For this purpose, guide rollers 18, 18 are mounted on the support frame 19' at a sufficient lateral spacing to spread the rails 3, 3, as shown in FIG. 6. As is best seen in FIG. 5, the rails are lifted off the ties to the height of the pair of guide rollers 18, 18, at which height they are supported by the rollers and held in laterally spread condition, permitting the ties to be picked up therebetween. At the beginning of the operation, the rails may be manually lifted or jacked up to the rollers 18, 18 but, once supported thereby, succeeding sections of the rails will be automatically lifted to the height of the rollers, as the apparatus moves forwardly in the direction of the arrows shown in each figure.

As will be described hereinafter, like guide and support rollers 18, 18 are mounted on the tie laying apparatus B at the rear of the track removing and laying apparatus of this invention and the spread ties 3 are led from the forward to the rear spreading and support rollers so that they are supported in the spread position off the ground during the entire operation.

FIGS. 7 and 8 illustrate the ballast leveling apparatus D, the rail spreading apparatus C and the ballast tamper E. As most other individual parts of the apparatus, the ballast leveling machine is conventional and, therefore, has been shown only schematically. It comprises a self-propelled half-track running on the ballast bed 20 and carrying at its front end a bucket conveyor moving in a horizontal plane and arranged in the center of the bed. The bucket conveyor removes ballast from the right of way and moves it to one side, thus leveling the bed and making it ready for placement of new ties 2.

Following leveling of the bed, any conventional ballast tamper may be used to compact the leveled ballast bed. The schematically illustrated apparatus E also comprises a half-track vehicle carrying a plurality of surface tampers at its front end for compacting the entire width of the right of way on which the new track is to be laid.

Mounted between apparatus D and E is the rail spreading device C consisting of two horizontally extending hydraulic jacks 9 whose piston rods carry rail-engaging rollers to engage old rails 3 and new rails 4 to spread them to the desired gage and maintain them spread between guide roller pairs 18, 18 at the front and rear portions of the apparatus.

The tie laying apparatus B is shown in detail in FIGS. 9 and 10. As shown schematically in these figures, the new ties 2 are brought from transport car 7 by conveyor 8 to a vertical chute 21 into which they are placed by trolleys 22 moving on overhead rails 22'. The overhead conveyor takes each tie 2 off conveyor 8 and drops it into chute 21 leading to the leveled and compacted ballast bed on which it comes to rest. Proper spacing between the newly laid ties is assured by stop 23.

This apparatus is carried by support frame 19" which is mounted on a carriage 19' rolling on the level and compacted ballast bed on two rolls.

As will be seen from FIGS. 5 and 9, small self-propelled wagons 17 move at the front end of the apparatus on the old rails 3, before they are taken up, and at the rear end on the newly laid rails 4. These wagons carry clamps for glidingly holding rails continuously fed therethrough. The old and the new rails are spread apart and off the ground during the operation, passing from front wagon 17 to rear wagon 17 over the two pairs of rollers 18, 18 and spreading devices 9, 9.

The above-described apparatus operates as follows:

If new rails are to be laid, in addition to new ties, the new rails are placed laterally adjacent the old track and interconnected into continuous lengths by welding or other means. The old rails are then loosened from the old ties and the slowly advancing apparatus will lift the loosened rails off the bed and spread them apart behind front transport cars 5, 5'. Simultaneously, the outwardly laterally adjacently placed new rails 4 will be similarly gripped by forward wagon 17 and spread over rollers 18, 18 whence they are returned down to the newly laid ties and in the proper gage by rear wagon 17. Thus, the rails are off the bed and spread apart between apparatus A and E. This apparatus picks up the old ties, conveys them to the transport cars 5, 5' levels the ballast bed from which the old ties have been removed, compacts the leveled bed, conveys the new ties from transport cars 7, 7' to the leveled and compacted bed, and lays them there. The new rails are then laid on the new ties and the rear transport cars move on the newly laid track. Preferably, the old rails 3 may be placed temporarily between the newly laid rails, for subsequent removal.

It will be understood that the term "new" rails refers only to the fact that they form part of a newly laid track and that such replacement rails may, in fact, be used rails.

While the invention has been described in connection with a specific embodiment, it will be understood that many modifications and variations may occur to the skilled in the art without departing from the spirit and scope of this invention as defined in the appended claims.

What we claim is:

1. A method of replacing an old track by a new track consisting of two rails supported on ties, comprising the steps of loosening the rails from the ties, spreading the old rails in a horizontal plane to a lateral spacing equal at least to the lengths of the ties, removing the old ties and laying new ties between the spread rails, the old ties being removed and the new ties being laid perpendicularly to the elongation of the track, and replacing the rails on the newly laid ties.

2. The method of claim 1, comprising the further steps of lifting the loosened old rails before they are spread and maintaining them lifted and spread while the old ties are removed and the new ties are laid.

3. The method of claim 1, comprising the further steps of placing new rails on the old ties adjacent the first mentioned rails, spreading the new rails in a horizontal plane to a lateral spacing equal at least to the lengths of the ties while the old ties are removed and the new ties are laid, and laying the new rails on the newly laid ties while the first mentioned rails are placed thereon adjacently thereto for subsequent removal.

4. A method of replacing an old track consisting of old ties and old rails supported thereon by a new track consisting of new ties and new rails supported thereon, comprising the step of loosening the old rails from the old ties, placing the new rails on the old ties adjacent the old rails, lifting the old and the new rails off the old ties while spreading them in a horizontal plane to a lateral spacing equal at least to the lengths of the ties, removing the old ties and laying the new ties between the spread rails while they remain lifted and spread, the old ties being removed and the new ties being laid perpendicularly to the elongation of the track, laying the new rails on the newly laid ties and placing the old rails adjacent to the new rails for subsequent removal.

5. An apparatus for replacing an old track by a new track consisting of two rails supported on ties, comprising a forward transport car for old ties, a rear transport car for new ties, and, arranged between the forward and rear transport cars, a means for spreading the track rails in a horizontal plane to a lateral spacing equal at least to the lengths of the ties, a means for removing the old ties, a means for laying the new ties, the means for removing and laying the ties being arranged to remove and lay the ties between the spread rails and perpendicularly to the elongation of the track, and respective conveyor means for conveying the old ties from the tie removing means to the forward transport car and from the rear transport car to the tie laying means.

6. The apparatus of claim 5, wherein the rail spreading means comprises horizontally extending hydraulic jack means for gripping and spreading the rails, said jack means being arranged between the means for removing the old ties and for laying the new ties.

7. The apparatus of claim 5, further comprising guide rollers associated with the means for removing the old ties and for laying the new ties, said guide rollers engaging the spread rails and maintaining them in spread condition.

8. The apparatus of claim 5, further comprising means for leveling and compacting the ballast bed between the means for removing the old ties and for laying the new ties.

No references cited.

ARTHUR L. LA POINT, *Primary Examiner.*

R. A. BERTSCH, *Assistant Examiner.*